(12) United States Patent
Cline et al.

(10) Patent No.: US 7,283,655 B2
(45) Date of Patent: Oct. 16, 2007

(54) SYSTEM AND METHOD FOR SEGMENTING TISSUE TYPES IN DUAL-ECHO MAGNETIC RESONANCE IMAGES

(75) Inventors: Harvey E. Cline, Schenectady, NY (US); Abdalmajeid Musa Alyassin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 861 days.

(21) Appl. No.: 10/608,832

(22) Filed: Jun. 26, 2003

(65) Prior Publication Data

US 2004/0264752 A1    Dec. 30, 2004

(51) Int. Cl.
*G06K 9/00* (2006.01)

(52) U.S. Cl. .................. 382/131; 382/164; 382/173

(58) Field of Classification Search ............. 382/128, 382/129, 130, 131, 132, 133, 134, 164, 171, 382/173, 177, 179, 224, 254; 600/410, 425; 324/309; 424/9.3, 9.4; 378/4, 21, 23–27, 378/901

See application file for complete search history.

(56) References Cited

U.S. PATENT DOCUMENTS 4,751,643 A * 6/1988 Lorensen et al. ........... 382/132
5,273,040 A * 12/1993 Apicella et al. ............ 600/410
5,361,763 A * 11/1994 Kao et al. .................. 600/410
5,551,431 A * 9/1996 Wells et al. ................ 600/410

OTHER PUBLICATIONS

Krishnan et al., "Segmentation of Multiple Sclerosis Lesions in MRI-An Image Analysis Approach", Department of Computer Science.

* cited by examiner

*Primary Examiner*—Samir Ahmed
*Assistant Examiner*—Abolfazl Tabatabai
(74) *Attorney, Agent, or Firm*—Maureen A. Bresnahan; Jean K. Testa

(57) ABSTRACT

A system and method is provided for classifying voxels of first and second images generated using first and second echoes of a dual MRI scan, the first and second echoes corresponding to respective first and second sets of image acquisition parameters. The method includes the steps of providing for accessing first image data corresponding to the first image including an array of voxels, the first image data including a first associated parameter value S1 for a parameter of the imaging associated with respective voxels of the array of voxels; providing for accessing second image data corresponding to the second image including the array of voxels, the second image data including a second associated parameter value S2 for the parameter of the imaging associated with respective voxels of the array of voxels; and providing for determining R and θ values associated with respective voxels of the array of voxels, wherein for each respective voxel R substantially equals $(S1^2+S2^2)^{1/2}$, and θ substantially equals arctan(S1/S2) for S1 and S2 associated with the respective voxel.

37 Claims, 2 Drawing Sheets

SYSTEM AND METHOD FOR SEGMENTING TISSUE TYPES IN DUAL-ECHO MAGNETIC RESONANCE IMAGES

FIELD OF THE INVENTION

The present disclosure relates to image processing, and particularly to segmentation of dual-echo magnetic resonance images.

BACKGROUND OF THE INVENTION

During a magnetic resonance (MR) imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to a main magnetic field. The slices can be taken in any plane chosen by the physician or technician performing the imaging session. The protons in the patient's body first absorb the radio waves and then emit the waves by moving out of alignment with the field. As the protons return to their original state (before excitation), diagnostic images based upon the waves emitted by the patient's body are created. MR image slices can be reconstructed to provide a 3-dimensional picture of the region of interest. In the reconstructed image, parts of the body that produce a high signal are displayed as white in an MR image, while those with the lowest signals are displayed as black. Other body parts that have varying signal intensities between high and low are displayed as some shade of gray.

Variations in image acquisition parameters affect various qualities of the reconstructed images generated. For example, in dual echo MR imaging, two images are generated for each slice, where the first and second images are generated using different image acquisition parameters such as different repetition times (TR) and/or echo times (TE). Depending on the parameters used for each image generated, one image may show better contrast between different certain tissues of interest, such as solid tissues, e.g., white and gray matter in the brain, while another image may show better contrast between other tissues of interest, such as fluids and solids, e.g., cerebrospinal fluid (CSF) and gray matter.

Image segmentation is useful for dividing an image into meaningful regions, such as for distinguishing between different tissue types. Typically, each voxel of the image is examined and assigned a label that associates it with a region, i.e., a tissue type for medical images, based on properties of the voxel, its neighbors or similarity to other voxels assigned to a region. The classification of voxels into tissue types allows for a highly intelligible display of information by the image, such as for educational or diagnostic purposes, for providing a guide during surgery, for defining boundaries of structures, for determining volumes of structures, and for monitoring changes in structural volumes. Multiple images taken at the same time or at different times may be used to study the same region of interest. Integration of information displayed in the multiple images is enhanced using a technique known as registration for correlating voxels of the multiple images.

One method of segmentation known in the art is cluster identification in a 2-D scatter plot (also known as a feature space), which includes using Cartesian coordinates mapping the intensity of sampled voxels from a first image obtained using a first echo (x-axis) vs. the intensity of sample voxels from a second image obtained using a second echo (y-axis). Clusters of voxels in the mapping, signifying voxels having similar properties and likely to correspond to the same tissue type, are identified and assigned a color. The clusters may be formed of a tight grouping or a spread out diffuse grouping of mapped points. Corresponding voxels in the first and second image (or other registered images) are also assigned the color for a displaying the cluster identification segmentation within the images. Further processing may be performed based on the colored images, such as identification of a specific structure within a tissue type, and volume measurement of a structure.

However, typically the cluster identification is performed with manual intervention using a qualitative analysis, which is time and resource consuming, and generates inconsistencies and subjectivity.

Accordingly, there is a need for a system and method for a quantitative analysis of a 2-D scatter plot in which manual intervention is minimized.

BRIEF DESCRIPTION OF THE INVENTION

A method is provided for classifying voxels of first and second images generated using first and second echoes of a dual MRI scan, the first and second echoes corresponding to respective first and second sets of image acquisition parameters. The method includes the steps of providing for accessing first image data corresponding to the first image including an array of voxels, the first image data including a first associated parameter value S1 for a parameter of the imaging associated with respective voxels of the array of voxels; providing for accessing second image data corresponding to the second image including the array of voxels, the second image data including a second associated parameter value S2 for the parameter of the imaging associated with respective voxels of the array of voxels; and providing for determining R and θ values associated with respective voxels of the array of voxels, wherein for each respective voxel R substantially equals $(S1^2+S2^2)^{1/2}$, and θ substantially equals arctan(S1/S2) for S1 and S2 associated with the respective voxel.

In another embodiment of the invention the method includes the steps of providing for accessing first image data corresponding to the first image including an array of voxels, the first image data including a first associated parameter value S1 for a parameter of the imaging associated with respective voxels of the array of voxels; providing for accessing second image data corresponding to the second image including the array of voxels, the second image data including a second associated parameter value S2 for the parameter of the imaging associated with respective voxels of the array of voxels; providing for plotting a first plot of a first plurality of points having Cartesian coordinates (x,y), each point of the first plurality of points correlating to a respective voxel of the array of voxels, wherein for each respective point of the first plurality of points x is the first associated parameter value associated with the correlating voxel, and y is the second associated parameter value associated with the correlating voxel; and providing for determining R and θ values associated with respective voxels of the array of voxels, wherein for each respective voxel R substantially equals the distance of the point correlating to the voxel as plotted in the first plot from an origin of the first plot, and θ substantially equals the angle of a line drawn through the origin of the first plot and the point from a positive x-axis of the first plot.

Steps of the method of the invention may be implemented by executing instructions on a processor, where the instructions are stored on a computer readable medium or included in a computer data signal embodied in a transmission medium.

In another embodiment of the invention a system for performing the steps of the method is provided including means for accessing first image data corresponding to the first image including an array of voxels, the first image data including a first associated parameter value S1 for a parameter of the imaging associated with respective voxels of the array of voxels; means for accessing second image data corresponding to the second image including the array of voxels, the second image data including a second associated parameter value S2 for the parameter of the imaging associated with respective voxels of the array of voxels; and means for determining R and $\theta$ values associated with respective voxels of the array of voxels, wherein for each respective voxel R substantially equals $(S1^2+S2^2)^{1/2}$, and $\theta$ substantially equals arctan(S1/S2) for S1 and S2 associated with the respective voxel.

DESCRIPTION OF THE PREFERRED EMBODIMENT

Figure 1:
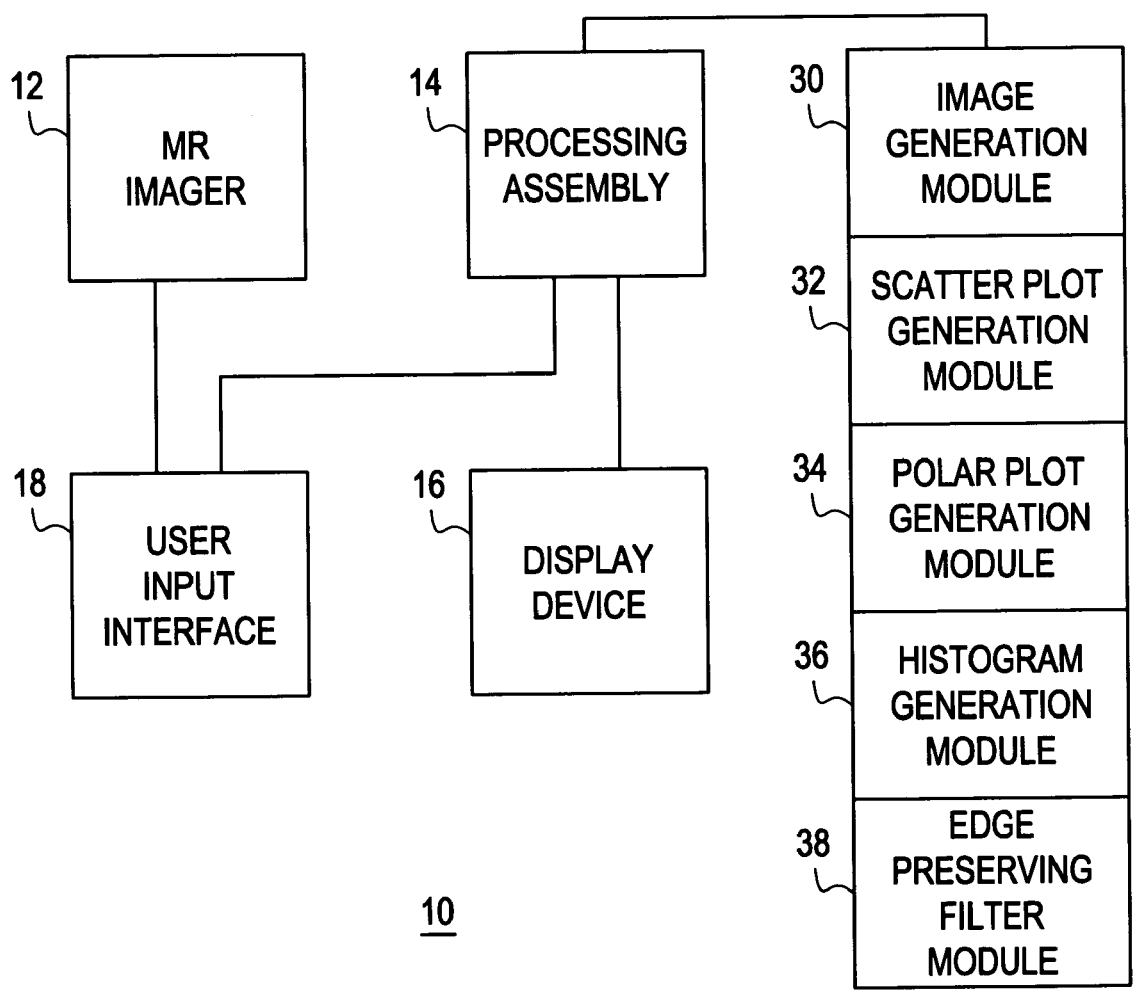
FIG. 1 is a block diagram of a magnetic resonance imaging system.

Referring to FIG. 1, an exemplary magnetic resonance (MR) imaging system 10 is shown including an MR imager 12 and a processor assembly 14, where the MR imager 12 images a region of interest within a patient in an imaging session (also referred to as a scan) using dual-echo MR imaging, and generates image data including at least first and second sets of image data that correspond to imaging of the region of interest using first and second echoes of an echo sequence, respectively. The exemplary system 10 further includes a display device 16 for displaying at least one image that corresponds to the image data, and a user input interface 18 for allowing a user to enter information, such as data and requests, to the processing assembly 14 and/or the imager 12. The processing assembly 14 receives and processes the generated image data for generating at least first and second displayable images, generating a 2-D scatter plot of signal intensities corresponding to the first and second images, generating a polar coordinate plot corresponding to the 2-D scatter plot, and filtering the polar coordinate plot with an edge preservation filter.

The exemplary MR imager 12 includes a system control unit, a gradient amplifier system, an RF amplifier, and power supplies, and an examination chamber (not shown). The examining chamber includes an assembly for receiving and positioning a patient, a main magnet assembly including an alignment system, a gradient coil system and an RF transmit and receive coils. During an imaging session a magnetic field is applied within the examination chamber, and modified by signals generated by the gradient coil system and the RF transmit/receive coils. The system control unit controls the gradient amplifier system and the RF amplifier for applying a series of radio frequency (RF) and magnetic field gradient pulses to invert or excite magnetic spins; and to induce, refocus, manipulate and/or encode (e.g., spatially) magnetic resonance. Resonance signals are received by the RF coils, demodulated, digitized and provided to the processing assembly 14 as 3-D image data including a plurality of voxels.

An imaging sequence is determined by the RF pulses and/or the magnetic field gradient pulses, as controlled by the system control unit in response to operator entered selections. In the example provided, the image sequence selected is spin echo, including a series of sub-sequences including an excitation 90 degree RF pulse followed by first and second spaced inversion 180 RF pulses. Consecutive excitation pulses are spaced by repetition time (TR). Data corresponding to the first and second sets of echo data are acquired following the first and second inversion pulses at times TE1 and TE2, respectively, where the first and second sets of echo data are processed by the processor assembly 14 for generating first and second images, respectively, as described further below.

TR, TE1 and TE2 (where the first and second inversion pulses are applied at TE1/2 and (TE1+(TE2-TE1)/2) are operator selectable image acquisition parameters for acquiring images having desired characteristics, such as proton density weighted, T2 weighted and T1 weighted. When acquiring T1-weighted images, short repetition times are used in which the T1-weighted image is acquired as an additional sequence rather than a two-echo sequence. T1-weighted images can be rapidly acquired, adding ittle time to another image acquisition.

In the present example, TR, TE1 and TE2 are selected so that TR is long, TE1 is short and TE2 is long, for generating a first proton density weighted image in which tissues having a high density of hydrogen atoms are brightest, and a second T2-weighted image in which tissues having a long transverse relaxation time (T2), mostly fluids, are brightest. Typically, TR, TE1 and TE2 values for obtaining the first proton density weighted image and the second T2-weighted image are substantially 2000 msec<=TR<=3000 msec; 20 msec<=TE1<=30 msec; and 80 msec<=TE2<=10 msec; where the ratio of TE2:TE1 is in the range of about 2:1 to 5:1; the ratio of TR:TE1 is in the range of about 67:1 to 150:1; and the ratio of TR:TE2 is in the range of about 20:1 to 38:1. In the present example, an MR scan of a patient's head is performed using TR=3000 ms, TE1=30 ms and TE2=80 ms.

It is envisioned that the imaging sequence includes a series of subsequences including a first excitation pulse followed by the first inversion pulse after which data corresponding to the first set of data is acquired at time TE1 after the first inversion pulse, followed by a second excitation pulse followed by the second inversion pulse after which data corresponding to the second set of data is acquired at time TE2 after the second inversion pulse. Consecutive excitation pulses are spaced by repetition time TR.

At each data acquisition data corresponding to a 2-dimensional plane (or slice) is acquired. Individual data acquisitions are acquired corresponding to different planes (or slices), so that data acquired for a series of data acquisitions corresponds to a 3-dimensional space. Accordingly, data corresponding to the respective first and second sets of image data acquired for a series of data acquisitions each correspond to substantially the same 3-dimensional space, where the first and second sets of image data are density weighted and T2 weighted, respectively.

The processing assembly 14 includes at least one processor, such as a microprocessor, a CPU, a personal computer, a PDA, a hand-held computing device, a mainframe computer, etc. Processors of the processing assembly 14 may be in data communication with one another, such as by a network such as a LAN, WAN, intranet, internet, etc. The processing assembly 14 further includes an input port 16 for receiving the image data. The input port 16 provides an interface between the MR imager 12 and the processor assembly 14.

A variety of software modules executable by the processing assembly 14 are accessed by the processing assembly 14, and executed thereby for processing of the image data, and for determination of the condition of the region of interest. The software modules each include a series of programmable instructions executable on the processing assembly 14. The software modules may be stored on at least one computer readable medium (e.g., RAM, floppy, CD-ROM, flash memory, hard drive, etc.) or be included in a computer data signal embodied in a transmission that is accessible by the processing assembly 14. The at least one storage medium, and/or a drive associated therewith, may be external to or included within the processing assembly 14. The means for transmitting the signal may be partially or fully external to and/or included in the processing assembly 14.

The software modules include an image generation module 30, a scatter plot generation module 32, a polar plot generation module 34, a histogram generation module 36, and an edge preserving filter module 38. The image generation module 30 includes an algorithm which processes the image data, including the first and second sets of image data, and generates a displayable 3-D image set including a plurality voxels Vxyz, where x, y and z indicate the a position in three dimensional space along the x, y and z-axes, respectively. Each voxel $V_{xyz}$ has associated with it first and second intensity signal sets S1 and S2, respectively, where S1 and S2 are intensity values that correspond to the first and second image, respectively. For spin echo imaging, intensity values $S1_{xyz}$ and $S2_{xyz}$ for a voxel $V_{xyz}$ are as follows, as is known in the art:

$$S1_{xyz}=\exp(-TE1/T2_{xyz})(1-\exp(-TR/T1_{xyz})); \quad (1)$$

$$S2_{xyz}=\exp(-TE2/T2_{xyz})(1-\exp(-TR/T1_{xyz})); \quad (2)$$

where $T1_{xyz}$ and $T2_{xyz}$ are included in the image data that corresponds to the voxel $V_{xyz}$.

Figure 2:
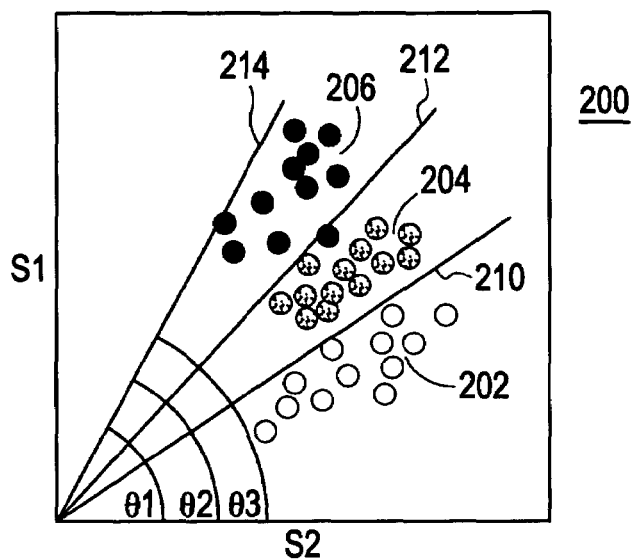
FIG. 2 is a scatter plot of image data generated, during an imaging session.

The scatter plot generation module 32 includes an algorithm which plots for individual voxels $V_{xyz}$, where the individual voxels are typically sampled voxels, on a Cartesian coordinate plot with S2 plotted along the X-axis and S1 plotted along the Y-axis. An exemplary scatter plot 200 for a dual echo MRI scan is shown in FIG. 2. Clusters 202, 204 and 206 are shown, however a clear demarcation between the clusters is not apparent. Typically, a manual analysis of the scatter plot is performed to identify the clusters and to associate voxels in an appropriate cluster. Radial lines 210, 212, 214 oriented at angles θ1, θ2 and θ3 with respect to the X-axis, respectively, indicate estimated divisions between the clusters. The radial lines define respective sectors having angles θ1, θ2-θ1, θ3-θ2. However, the radial line 212 is oriented so that a voxel 210 which belongs in cluster 206 is included with cluster 204.

The polar plot generation module 34 includes an algorithm which calculates an angle $\theta_{xyz}$ and radius value $R_{xyz}$ for individual voxels $V_{xyz}$, where the individual voxels are typically sampled voxels, in accordance with the equations:

$$\theta_{xyz}=\arctan(S1_{xyz}/S2_{xyz})=\arctan(\text{intensity ratio})= \arctan(\exp((TE2-TE1)/T2_{xyz})) \quad (3)$$

$$R_{xyz}=(S1_{xyz}^2+S2_{xyz}^2)^{1/2} \quad (4)$$

Equation (3) shows that θ correlates with T2 and indicates tissue type. The angle and radius values may be calculated directly from the image data received from the imaging device 12, the 3-D displayable image data set generated by the image generation module 30, or the scatter plot generated by the scatter plot generation module 32.

Figure 3:
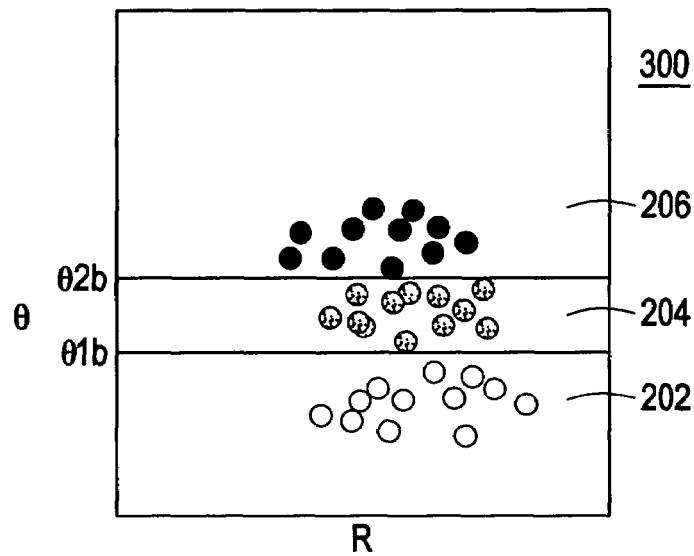
FIG. 3 is a polar coordinate plot of the image data plotted in FIG. 2.

The polar plot generation module 34 may further include an algorithm that plots the values for $\theta_{xyz}$ and $R_{xyz}$ on a polar coordinate plot 300, which may be provided to the display device 16 for display, as shown in FIG. 3.

The histogram generation module 36 includes an algorithm for analyzing the frequency distribution of voxels $V_{xyz}$ for angles generated by the polar plot generation module 34 for determining the boundary or edges of clusters and the demarcation between adjacent clusters. The histogram generation module 36 determines the frequency distribution of voxels $V_{xyz}$ examined or sampled over values for θ, i.e., the number $N_\theta$ of voxels $V_{xyz}$ having a corresponding angle θ or range of angles. Each cluster typically has a concentrated amount (larger frequency) of voxels, i.e., a peak, in its interior region relative to a diffused amount (lower frequency) of voxels, i.e., valleys at its boundary region. The analysis by the algorithm of the histogram generation module 36 recognizes the boundaries of the clusters and divisions between adjacent clusters by recognizing the boundary area for each cluster, which are the outer angles of the frequency distribution of each cluster having a minimum frequency for the cluster. For example, the histogram may be smoothed and the minima from a curve fit through the histogram would then separate the clusters.

Figure 4:
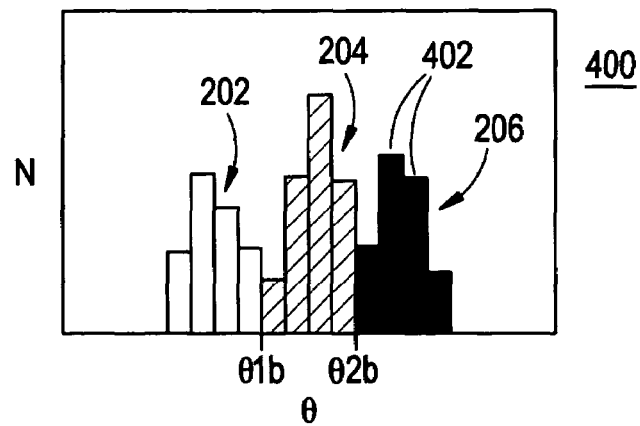
FIG. 4 is a frequency distribution histogram of the image data plotted in FIG. 3.

The histogram generation module 36 may include an algorithm for plotting θ versus Nθ, such as histogram 400 shown in FIG. 4, where θ is plotted along the X-axis and Nθ is plotted along the Y-axis. The width of the rectangles 402 represents a range of angles, and the height represents the number of voxels $V_{xyz}$ having an angle that falls within the angle range, i.e., frequency thereof. Since the angle depends on T2, valleys in the angle histogram indicate boundaries or edges between adjacent clusters, such as shown in FIG. 4 for clusters 202, 204, 206. The demarcations between the clusters may by determined by mathematical analysis of the θ values for the voxels $V_{xyz}$ being examined, and/or analysis of the plotted histogram 400. In FIG. 4, demarcations are recognized at θ1b and θ2b. Horizontal lines corresponding to θ1b and θ2b have been drawn on FIG. 3, showing the demarcation between the clusters plotted in the polar plot 300.

A color is assigned to each cluster, so that each voxel belonging to a cluster is assigned the corresponding color. The image generated by the image generation module 30 is redisplayed with the individual voxels displayed in the respective color assigned. Accordingly, the image shows segmentation in accordance with the cluster recognition.

The edge preserving filter module 38 includes an algorithm which processes the histogram generated by the histogram generation module 34 for filtering out noise while preserving edges, such as by a median filter or other edge preserving noise-removing filter. The edge preserving filter module 38 does not change image parameters, such as T2 and proton density.

The described embodiments of the present disclosure are intended to be illustrative rather than restrictive, and are not intended to represent every embodiment of the resent disclosure. Various modifications and variations can be made without departing from the spirit or scope of the present disclosure as set forth in the following claims both literally and in equivalents recognized in law.

What is claimed is:

1. A method for classifying voxels of first and second images generated using first and second echoes of a dual MRI scan, the first and second echoes corresponding to respective first and second sets of image acquisition parameters, the method including the steps of:
   providing for accessing first image data corresponding to the first image including an array of voxels, the first image data including a first associated parameter value S1 for a parameter of the imaging associated with respective voxels of the array of voxels;
   providing for accessing second image data corresponding to the second image including the array of voxels, the second image data including a second associated parameter value S2 for the parameter of the imaging associated with respective voxels of the array of voxels; and
   providing for determining R and $\theta$ values associated with respective voxels of the array of voxels, wherein for each respective voxel R substantially equals $(S1^2+S2^2)^{1/2}$, and $\theta$ substantially equals arctan(S1/S2) for S1 and S2 associated with the respective voxel.

2. The method according to claim 1, wherein the parameter of the imaging is intensity.

3. The method according to claim 1, wherein the first image is a density-weighted image.

4. The method according to claim 1, wherein the first set of image acquisition parameters is configured for acquiring a density-weighted image.

5. The method according to claim 4, wherein the first set of image acquisition parameters includes a repetition time (TR) and an echo time (TE) in a spin-echo sequence, wherein a TR:TE ratio ranges substantially from 67:1 to 150:1.

6. The method according to claim 1, wherein the second image is a T2-weighted image.

7. The method according to claim 6, wherein the second set of image acquisition parameters is configured for acquiring a T2-weighted image.

8. The method according to claim 7, wherein the second set of image acquisition parameters includes repetition time (TR) and an echo time (TE) in a spin-echo sequence, wherein a TR:TE ratio ranges substantially from 20:1 to 38:1.

9. The method according to claim 1, further comprising the step of providing for determining a frequency distribution of respective voxels of the array of voxels over a plurality of corresponding $\theta$ values.

10. The method according to claim 9, further comprising the step of providing for plotting a third plot of $\theta$ versus frequency distribution.

11. The method according to claim 9, further comprising the steps of:
   providing for determining respective peaks in the frequency distribution; and
   providing for determining at least one $\theta$ value that corresponds to the peaks;
   wherein each respective peak is associated with a cluster of voxels of the array of voxels including voxels having an associated $\theta$ value substantially equal to the at least one $\theta$ value that corresponds to the peaks.

12. The method according to claim 11, further comprising the steps of:
   providing for determining a range of $\theta$ values for each respective peak bounding the at least one $\theta$ value that corresponds to the respective peak, which has a frequency distribution indicative of association with the cluster associated with the peak; and
   providing for assigning voxels having an associated $\theta$ value that is within the range of the bounding $\theta$ values to belong to the cluster.

13. The method according to claim 12, further comprising the step of generating a displayable image of the image data, wherein voxels assigned to each cluster are displayed having a same displayable feature, wherein the feature when displayed is distinguishable from a displayed feature of voxels assigned to a different cluster.

14. The method according to claim 1, further comprising the step of providing for plotting a first plot of a first plurality of points having Cartesian coordinates (x,y), each point of the first plurality of points correlating to a respective voxel of the array of voxels, wherein for each respective point of the first plurality of points x is the first associated parameter value associated with the correlating voxel, and y is the second associated parameter value associated with the correlating voxel.

15. The method according to claim 1, further comprising the step of providing for plotting a second plot of a second plurality of points having polar coordinates (radius, angle), each point of the second plurality of points correlating to a respective voxel of the array of voxels, wherein for each respective point of the second plurality of points the radius coordinate is equal to R determined for the correlating voxel, and the angle coordinate is equal to $\theta$ determined for the correlating voxel.

16. The method according to claim 15, further comprising the step of providing for filtering the second plurality of points with an edge preserving filter.

17. A method for classifying voxels of first and second images generated using first and second echoes of a dual MRI scan, the first and second echoes corresponding to respective first and second sets of image acquisition parameters, the method including the steps of:
   providing for accessing first image data corresponding to the first image including an array of voxels, the first image data including a first associated parameter value S1 for a parameter of the imaging associated with respective voxels of the array of voxels;
   providing for accessing second image data corresponding to the second image including the array of voxels, the second image data including a second associated parameter value S2 for the parameter of the imaging associated with respective voxels of the array of voxels;
   providing for plotting a first plot of a first plurality of points having Cartesian coordinates (x,y), each point of the first plurality of points correlating to a respective voxel of the array of voxels, wherein for each respective point of the first plurality of points x is the first associated parameter value associated with the correlating voxel, and y is the second associated parameter value associated with the correlating voxel; and
   providing for determining R and $\theta$ values associated with respective voxels of the array of voxels, wherein for each respective voxel R substantially equals the distance of the point correlating to the voxel as plotted in the first plot from an origin of the first plot, and $\theta$ substantially equals the angle of a line drawn through the origin of the first plot and the point from a positive x-axis of the first plot.

18. The method according to claim 17, wherein the parameter of the imaging is intensity.

19. The method according to claim 17, wherein the first image is a density-weighted image.

20. The method according to claim 17, wherein the second image is a T2-weighted image.

21. A system for classifying voxels of first and second images generated using first and second echoes of a dual MRI scan, the first and second echoes corresponding to respective first and second sets of image acquisition parameters, the system comprising:
  means for accessing first image data corresponding to the first image including an array of voxels, the first image data including a first associated parameter value S1 for a parameter of the imaging associated with respective voxels of the array of voxels;
  means for accessing second image data corresponding to the second image including the array of voxels, the second image data including a second associated parameter value S2 for the parameter of the imaging associated with respective voxels of the array of voxels; and
  means for determining R and θ values associated with respective voxels of the array of voxels, wherein for each respective voxel R substantially equals $(S1^2+S2^2)^{1/2}$, and θ substantially equals arctan(S1/S2) for S1 and S2 associated with the respective voxel.

22. The system according to claim 21, wherein the parameter of the imaging is intensity.

23. The system according to claim 21, wherein the first image is a density-weighted image.

24. The system according to claim 21, wherein the first set of image acquisition parameters is configured for acquiring a density-weighted image.

25. The system according to claim 24, wherein the first set of image acquisition parameters includes a relatively long repetition time (TR) and a relatively short echo time (TE) in a spin-echo sequence, wherein a TR:TE ratio ranges substantially from 67:1 to 150:1.

26. The system according to claim 21, wherein the second image is a T2-weighted image.

27. The system according to claim 21, wherein the second set of image acquisition parameters is configured for acquiring a T2-weighted image.

28. The system according to claim 27, wherein the second set of image acquisition parameters includes a relatively long repetition time (TR) and a relatively long echo time (TE) in a spin-echo sequence, wherein a TR:TE ratio ranges substantially from 20:1 to 38:1.

29. The system according to claim 21, further comprising means for determining a frequency distribution of respective voxels of the array of voxels over a plurality of corresponding θ values.

30. The system according to claim 29, further comprising means for plotting a third plot of θ versus frequency distribution.

31. The system according to claim 29, further comprising:
  means for determining respective peaks in the frequency distribution; and
  means for determining at least one θ value that corresponds to the peaks;
  wherein each respective peak is associated with a cluster of voxels of the array of voxels including voxels having an associated e value substantially equal to the at least one θ value that corresponds to the peaks.

32. The system according to claim 31, further comprising:
  means for determining a range of θ values for each respective peak bounding the at least one θ value that corresponds to the respective peak, which has a frequency distribution indicative of association with the cluster associated with the peak; and
  means for assigning voxels having an associated θ value that is within the range of the bounding θ values to belong to the cluster.

33. The system according to claim 32, further comprising means for generating a displayable image of the image data, wherein voxels assigned to each cluster are displayed having a same displayable feature, wherein the feature when displayed is distinguishable from a displayed feature of voxels assigned to a different cluster.

34. The system according to claim 21, further comprising means for plotting a first plot of a first plurality of points having Cartesian coordinates (x,y), each point of the first plurality of points correlating to a respective voxel of the array of voxels, wherein for each respective point of the first plurality of points x is the first associated parameter value associated with the correlating voxel, and y is the second associated parameter value associated with the correlating voxel.

35. The system according to claim 21, further comprising means for plotting a second plot of a second plurality of points having polar coordinates (radius, angle), each point of the second plurality of points correlating to a respective voxel of the array of voxels, wherein for each respective point of the second plurality of points the radius coordinate is equal to R determined for the correlating voxel, and the angle coordinate is equal to θ determined for the correlating voxel.

36. The system according to claim 35, further comprising means for filtering the second plurality of points with an edge preserving filter.

37. A tangible computer readable medium storing a set of computer programmable instructions on a tangible computer readable medium configured for execution by at least one processor for classifying voxels of first and second images generated using first and second echoes corresponding to respective first and second sets of image acquisition parameters, the computer programmable instructions comprising:
  steps for providing for accessing first image data corresponding to the first image including an array of voxels, the first image data including a first associated parameter value S1 for a parameter of the imaging associated with respective voxels of the array of voxels;
  steps for providing for accessing second image data corresponding to the second image including the array of voxels, the second image data including a second associated parameter value S2 for the parameter of the imaging associated with respective voxels of the array of voxels; and
  steps for providing for determining R and θ values associated with respective voxels of the array of voxels, wherein for each respective voxel R substantially equals $(S1^2+S2^2)^{1/2}$, and θ substantially equals arctan(S1/S2) for S1 and S2 associated with the respective voxel.

* * * * *